No. 12,672. REISSUED JULY 16, 1907.

G. A. GABRIEL.

ELECTROLYTIC CELL.

APPLICATION FILED APR. 9, 1907.

2 SHEETS—SHEET 1.

WITNESSES:

Edw. W. Vaill Jr.

John W. Peters

INVENTOR

George A. Gabriel

BY

Betts, Sheffield, Betts & Betts

ATTORNEYS

No. 12,672. REISSUED JULY 16, 1907.

G. A. GABRIEL.

ELECTROLYTIC CELL.

APPLICATION FILED APR. 9, 1907.

2 SHEETS—SHEET 2.

WITNESSES:

Edw. W. Vaill Jr.

John W. Peters

INVENTOR

George A. Gabriel

BY

Betts, Sheffield, Beutely & Betts

ATTORNEY

UNITED STATES PATENT OFFICE.

GEORGE A. GABRIEL, OF NEW YORK, N. Y., ASSIGNOR TO BLEACH & CAUSTIC PROCESS COMPANY, OF NEW YORK, N. Y., A CORPORATION OF NEW YORK.

ELECTROLYTIC CELL.

No. 12,672. Specification of Reissued Letters Patent. Reissued July 16, 1907.

Original No. 822,109, dated May 29, 1906, Serial No. 302,854. Application for reissue filed April 9, 1907. Serial No. 367,300.

*To all whom it may concern:*

Be it known that I, GEORGE A. GABRIEL, a citizen of the United States, and a resident of the city of New York, borough of Brooklyn, county of Kings, State of New York, have invented certain new and useful Improvements in Electrolytic Cells, of which the following is a full, clear, and complete disclosure.

My invention particularly relates to electrolytic cells for the electric separation and production of certain elements or constituents of liquids contained in an electrolyte, on a commercial scale.

The object of my invention is to improve the general construction and arrangement of such electrolytic cells, thereby increasing the convenience, economy, and efficiency of such cells.

My improvements are shown in connection with an electrolytic cell known as the "Hargreaves" or vertical type, and particularly relate to means for leading the liquid, which percolates through the porous diaphragm thereof, away from such diaphragm, thus obviating the danger of back percolation, which injures the electrolytic solution from which the products are to be separated.

My improvements also comprise other features of construction and arrangement hereinafter to be more completely described, and claimed in the accompanying claims.

For a full, clear, and exact description of one form of my invention, reference may be had to the following specification and to the accompanying drawings, forming a part thereof, in which:—

Figure 1:
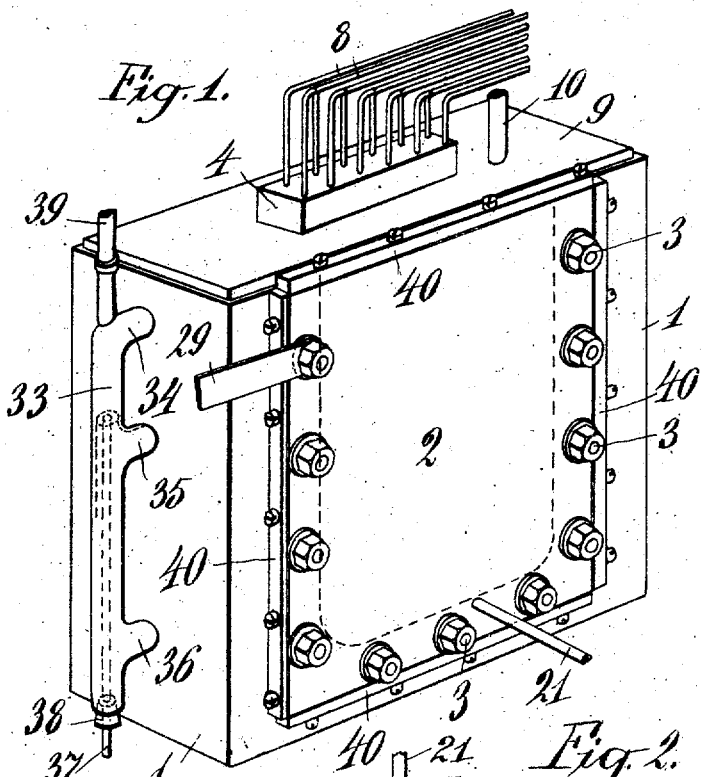
Figure 2:
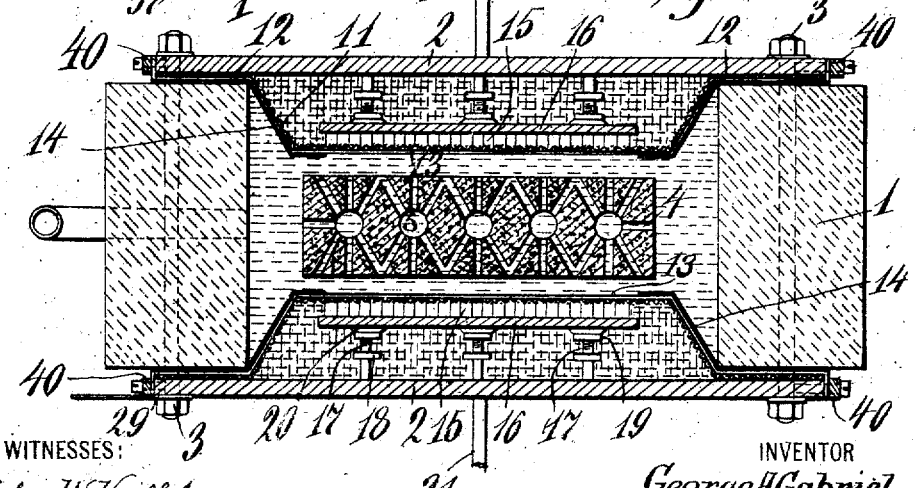
Figure 3:
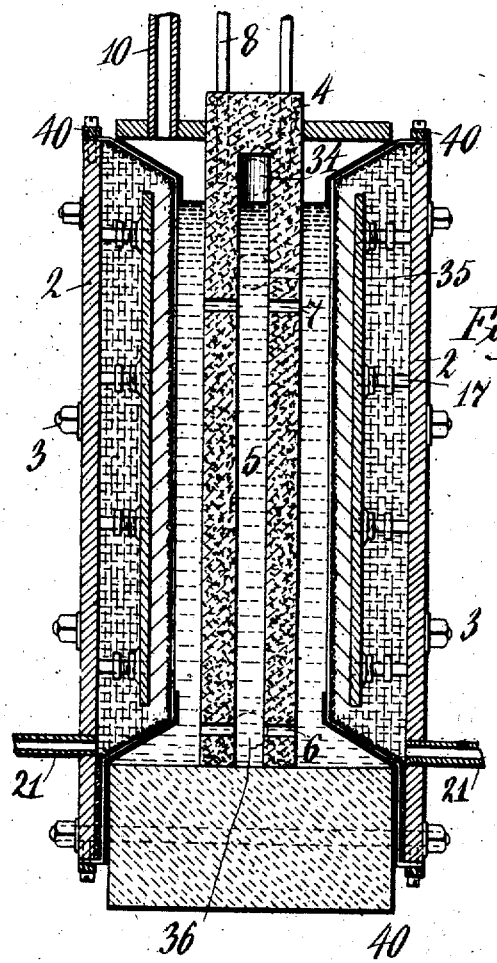
Figure 4:
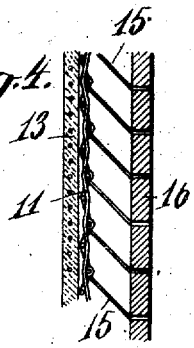
Figure 5:
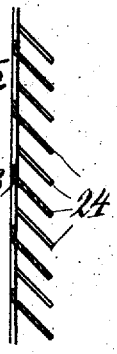
Figure 6:
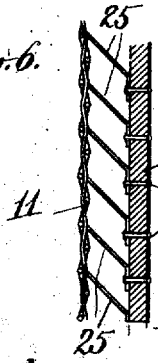
Figure 7:
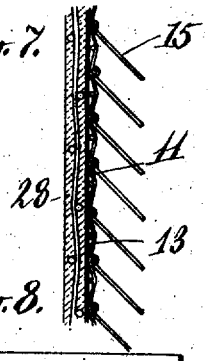
Figure 8:
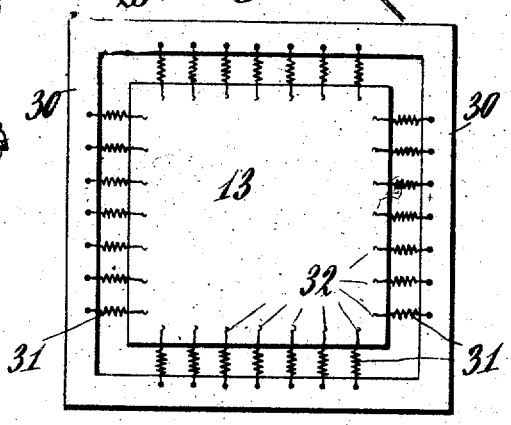

Figure 1 is a perspective view of my improved electrolytic cell complete; Fig. 2 is a horizontal transverse sectional view thereof; Fig. 3, a central vertical sectional view thereof; Fig. 4, a detailed sectional view showing the arrangement and construction of one form of cathode, and Figs. 5, 6 and 7 are sectional detailed views of other modifications of the cathode. Fig. 8 is an elevation of the apparatus used in forming the porous diaphragm.

Referring to the drawings, the numeral 1 indicates a U-shaped frame, preferably made of concrete or other cementitious material, which may be of a width substantially equal to that of the completed cell.

The numeral 2 represents the two sides of the cell, preferably made in the form of metallic plates, which are preferably of iron or steel. The plates 2 are attached to the U-shaped frame 1 by means of transverse bolts 3, which pass through suitable holes in said frame and through the ends and bottoms of the plates 2.

The boundaries of the cell, or the parts forming the cell walls proper, as concerns the active materials in the cell, manifestly consist of the inner surfaces of the container or of the walls of cementitious material, and these determine the boundaries or the contact margins of the fluids therein.

The positive pole or anode element of the cell may consist of one or more blocks or prisms 4 of suitable material, such as carbon. These are preferably made of the so-called "Acheson" graphite, and are provided with vertical and horizontal passages 5, 6, and 7, to allow of a thorough circulation of the electrolyte through or about the anode or its faces, within the cell. The horizontal passages 6 and 7 should preferably be separated by substantially the depth of the liquid in the anode chamber, so that the liquid may form a complete circuit and that circulation may take place over the entire active area or surface of the anode. The anode 4 also has suitable conductors 8, which form one of the terminals to be connected to a suitable source of electric current or to another cell, if more than one cell are to be used in series. The anode 4 rests upon the bottom of the frame 1 and extends through an opening in a suitable cover 9, which is placed upon the top of the cell and made gas or air tight by suitable packing, such as cement. The cover 9 is also provided with a conduit 10, through which the electrolyte may be continuously introduced to the interior of the cell.

The cathode of my improved cell may be made as follows: The numeral 11 indicates a foraminous screen which is bent to the shape indicated, so that its marginal edges 12 may be retained between the margins of the plate 2 and U-shaped frame 1. Upon one side of the screen 11 is placed a porous diaphragm 13, which conforms to the shape of said screen and which is also retained between the plates 2 and the frame 1. The method of making this porous diaphragm will be hereinafter more particularly described. In order to restrict the active surface of the porous diaphragm 13 and of the screen 11, which forms an active portion of the cathode, I use an insulating material (indicated at 14). This insulating material is made approximately the same shape as the screen 11 and the diaphragm 13, but has an opening throughout its central portion which is slightly smaller than the central plane portion of said diaphragm and screen. This insulating material may consist of such substances as heavy oiled silk, mica, oiled paper, or hard vulcanized rubber, any of which substances will withstand the high temperature of the anolyte. This insulating material is preferably first attached to the diaphragm 13 when the cell is being assembled by means of cement, after which the hydrostatic pressure of the electrolyte within the cell will tend to keep such insulating material in position upon the diaphragm. When these parts, including the screen, diaphragm, and insulation, are assembled, their edges are clamped between the side walls or plates 2 and the U-shaped frame 1 by means of transverse bolts 3.

The end walls of the cell, consisting as they do of insulating material, may be utilized in whole or in part to perform the function of the insulating member that restricts the active surfaces of the adjacent parts, or they may aid in so doing. This construction limits the exposed area of the diaphragm that is in contact with the main body of the electrolyte to substantially that of the adjacent surface of the anode, but at the same time allows the active surface of the cathode to be of considerably greater area than the adjacent active surface of the anode. This is due to the fact that the electrolyte in passing through the diaphragm by osmotic action may spread out on the outer face of the diaphragm, and therefore reach a greater area of the cathode. This provides adequate cathode-surface to treat all of the electrolyte that passes through the diaphragm.

One important feature of my invention resides in the means for leading away from the outer side of the screen or cathode 11, the liquid which percolates through the diaphragm 13. This means may be formed in several different ways, examples of which are illustrated in detail in Figs. 4 to 7, inclusive, of the drawings. One modification of these draining means, which is shown in Fig. 4, comprises a series of downwardly-inclined wires 15, the upper ends of which are twisted around or otherwise attached to the strands or wires forming the screen 11. The wires 15 are all substantially the same length and are preferably of spring metal, so as to have a considerable resiliency. These wires 15 form conduits, which, owing to the adhesion of the liquid which percolates through the diaphragm, lead or conduct such liquid away from the diaphragm and the screen itself, so that the said liquid drops from the ends of the wires or is conducted to a plate 16, which I preferably term a "drain-plate." This drain-plate is preferably of the same material as the cathode and conduits 15 and is forced into contact with the ends of said wires by means of screws 17, the outer ends of which are provided with thumb-heads 18, said ends also bearing against the side wall or plate 2 of the cell. The inner screw-threaded ends of screws 17 pass through set-nuts 19 and into screw-threaded bosses 20, which rest upon or are attached to the drain-plate 16. It will be seen that by means of these screws 17 pressure may be brought to bear upon the drain-plate 16, so that its entire inner surface is in contact with the ends of the conduits or projections 15. This construction not only serves to produce the mechanical results just mentioned, but also serves to make a complete and free electrical connection between the side walls 2 and the cathode, so that the electric current is evenly distributed over the whole surface of the cathode. It will now be seen that the liquid which is conducted from the screen or cathode proper, 11, by the conduits 15 flows upon the drain-plate 16 and thence to the bottom of the cathode-chamber, from which the liquid is carried away by any convenient means, such as a pipe or tube 21.

It will be noticed that in Fig. 4 the drain-plate 16 is provided with a series of transverse holes 22, which correspond in location with the ends of the conduits or projections 15. These holes 22 allow the liquid to flow over both sides of the plate, and therefore increases its draining capacity.

In Fig. 5 I have shown a construction in which the cathode-screen is formed of a metallic plate 23, out of which the conduits or projections 24 are punched by suitable dies. The removal of the portions 24 from the main body of the plate forms openings through which the liquid from the diaphragm may pass.

In Fig. 6 I have shown a modification in which the conduits 25 are attached to the drain-plate 26 instead of to the screen. In this case the projections may be attached in any suitable way, such as by use of rivets 27. It will be obvious in this instance that the screws 17 will force the conduits or projections 25 against the cathode-screen 11, and thereby form a good electrical connection in a manner similar to that above described in connection with Fig. 4.

In Fig. 7 I have shown a modification of the manner of arranging the diaphragm. In this form of the invention the cathode or screen 11, and diaphragm 13 are arranged as described in connection with Figs. 1 and 2; but in addition to these parts I provide another diaphragm 28, which is formed in a manner similar to the diaphragm 13, but upon a base or ground made of wire-gauze instead of fibrous material, as before described. This construction gives an additional strength to the cell and also provides an additional thickness to the diaphragm where the percolation of the anolyte is made less or where the hydrostatic pressure of the anolyte is made greater.

On the exterior of the cell I provide a vertical tube or pipe 33, which has, preferably, three branches 34, 35 and 36, the principal branch 34 entering the cell above the normal level of the electrolyte, the branch 35 entering the cell slightly below the normal level of the electrolyte, and the branch 36 entering the cell near the bottom of the anode-chamber. Within the tube 33 I place a smaller tube 37, which passes through a suitable stopper or packing 38 at the lower end of the tube 33 and upwardly within said tube 33 to a point which determines the level of the electrolyte in the anode-chamber. It will thus be seen that if the electrolyte flows into the cell continuously a certain amount of the fluid will overflow through tube 37 and be conducted away. This liquid which is carried away will be weaker, owing to the fact that it is taken in through the branch 35 near the level or surface of the electrolyte within the cell. At the upper end of the tube 33 I attach a pipe or conduit 39, through which the gas generated in the anode-chamber may pass and be conducted to a suitable gasometer or to a collecting apparatus.

The outer tube 33 is preferably made wholly or in part of transparent material, so that not only may the level of the liquid within the cell be inspected, but also the circulation of the anolyte through the branches 35 and 36 may be seen. The fact that this circulation of the anolyte may be seen allows a close watch to be kept upon the condition of the anolyte and the action of the cell itself.

As a connection for conveying the current away from the cathode of my improved cell I may bolt a metallic strip 29 to one or more transverse bolts 3 of the cell. This connector 29 may of course extend to the next cell in the series or to one pole of a generator for supplying the necessary electric current.

Referring now to the means for forming the diaphragm 13, Fig. 8 shows the apparatus used therefor. The member 30 is a rectangular frame, made of suitable material, which has attached thereto upon its four sides a series of coiled springs 31, the inner ends of which are provided with hooks 32, adapted to pass through and engage the diaphragm 13 which is being treated. The diaphragm is first placed in a frame, as indicated, so that all the hooks engage the margin thereof successively. The fabric is then moistened and allowed to dry under the tension of the spring 31. When once dried, the fabric is again dampened and is then covered by the coating of cement and water or clay and silicate of soda or other suitable cementitious mixture or composition in a plastic state. This mixture is rubbed thoroughly into the interstices of the fabric and the surfaces made smooth and even on both sides. The fabric and cementitious material is then allowed to set and harden to the consistency in which it is to be used, after which the screen is removed from the frame and placed in a suitable mold or between suitable dies to give the same the requisite shape to correspond to the shape of the cathode 11. If preferable, it is obvious that the diaphragm may be molded or shaped before the cementitious material has become set or hardened. When this diaphragm, so formed, is placed in position over the cathode or screen 11, it will be firmly stretched and drawn into position by means of the bolts 3 and the side walls or plates of the cell 2.

It will be seen that the cell formed as above described has many advantages in operation and many points of efficiency not heretofore attained in electrolytic cells. The form of the anode shown not only allows a free circulation of the anolyte within the cell, but also forms a n adjustable member, so that the anode may be moved nearer to or farther away from either of the cathodes. It is obvious that the anode may be made in two separate parts instead of one single part, each of which parts may be adjusted to and from its respective cathode.

I wish to be understood that I do not desire to be limited to the exact details of construction shown and described, for obvious modification will occur to persons skilled in the art without departing from the spirit and scope of my invention.

Having thus described my invention, what I claim, and desire to protect by Letters Patent of the United States, is:—

1. In combination with an electrode, one face only of which is in contact with the active electrolyte, of liquid-conduits, extending from the opposite face thereof for conveying liquid away from said face.

2. In combination with a permeable electrode, one face only of which is in contact with the active electrolyte, of projections extending from the opposite face thereof for conveying liquid away from said face.

3. In combination with an electrode, of downwardly inclined liquid-conduits extending from a plurality of points on the face thereof, for draining liquids from substantially the entire face thereof by gravity.

4. In combination with a substantially upright electrode, of downwardly-inclined projections extending from the face thereof for conveying liquid away from said face by gravity.

5. In combination with an electrode, mechanical means coacting with the face thereof for removing and maintaining liquid out of contact with said face.

6. In an electrolytic cell, a porous diaphragm, a cathode located exteriorly of said diaphragm and in contact therewith, and mechanical means coacting with the face of the cathode for conveying liquid which percolates through said diaphragm away from the face of said cathode at a plurality of points.

7. In an electrolytic cell, a porous diaphragm, a cathode located exteriorly of said diaphragm and in contact therewith, and conduits for conveying liquid which percolates through said diaphragm away from the face of said cathode at a plurality of points.

8. In an electrolytic cell, a porous diaphragm, a cathode contacting exteriorly therewith, and downwardly-extending projections for conveying the liquid which percolates through said diaphragm away from said cathode.

9. In an electrolytic cell, a porous diaphragm, a foraminous cathode contacting therewith on one side, and projections extending from the opposite side of said cathode for draining the same.

10. In an electrolytic cell, a porous diaphragm, a foraminous cathode contacting therewith on one side, liquid-conduits on the opposite side of said cathode and a plate engaging said conduits.

11. In an electrolytic cell, a porous diaphragm, a foraminous cathode contacting therewith on one side, liquid-conduits on the opposite side of said cathode, and a perforated plate engaging said conduits.

12. In an electrolytic cell, a porous diaphragm, a foraminous cathode contacting therewith on one side, liquid-conduits on the opposite side of said cathode, a plate engaging said conduits, and means for forcing said plate toward said cathode and diaphragm.

13. The combination with a vertical cathode, of conduits extending downwardly from a plurality of points in the face thereof for draining the same.

14. The combination with a vertical cathode, of conduits extending downwardly from a plurality of points in the face thereof, and means forming connections between said conduits at their lower ends.

15. The combination with a vertical cathode, of conduits extending downwardly from a plurality of points in the face thereof and a foraminous drain-plate forming connections between said conduits at their lower ends.

16. In combination with an electrolytic cell, a vertical conduit exterior to the anode chamber and communicating directly with the interior thereof at points removed from the top and adjacent the bottom respectively to allow of circulation of the electrolyte.

17. In combination with an electrolytic cell, an exterior circulating-conduit and an adjustable overflow-pipe connecting with said conduit.

18. In combination with an electrolytic cell, an exterior vertical transparent conduit communicating with the interior thereof, and an adjustable overflow-tube located within said conduit.

19. In combination with an electrolytic cell, of a circulating means, comprising an exterior vertical transparent conduit having connecting portions which communicate with the interior of the cell, one connection being above the surface of the electrolyte, one slightly below the surface and one near the bottom of the anode-chamber.

20. In combination with an electrolytic cell, of an exterior conduit communicating with the interior thereof above and below the surface of the electrolyte, an adjustable overflow-tube connected therewith, and a gas-discharging tube connected with the top of said conduit.

21. A continuous anode for electrolytic cells having horizontal and vertical passages therein for the circulation of the electrolyte and cathodes of substantially similar outline located adjacent the opposite active faces of said anode.

22. In an electrolytic cell, an anode presenting practically parallel and opposite faces, and having a passage between such faces for the downward circulation of the electrolyte, and cathodes opposite each face and separated therefrom by intervening spaces, the anode having connecting openings or passages between the intermediate space and the outer spaces.

23. In an electrolytic cell, an anode presenting practically parallel and opposite faces and having a passage between such faces for the downward circulation of the electrolyte, cathodes opposite each face and separated therefrom by intervening spaces, said anode having a plurality of connecting openings or passages between the intermediate space and the outer spaces, said passages being separated by a considerable vertical height for causing a complete circulation of the electrolyte over the active faces of the anode.

24. In an electrolytic cell, an anode presenting practically parallel and opposite faces and having a passage between such faces for the downward circulation of the electrolyte, and cathodes opposite each face and separated therefrom by intervening spaces, the anode having connecting openings or passages between the intermediate space and the outer spaces, said passages being separated by practically the entire vertical height of the active face of the anode.

25. In an electrolytic cell of the character described, the positive or anode element of which presents faces in a predetermined plane, a foraminous cathode in a plane practically parallel therewith, a central cell body, and insulating material separate from said body and forming an adjustable shield for limiting the active area of said cathode at the margin thereof, the perforated portions of said cathode extending outwardly beyond the inner edges of said insulating material.

26. In an electrolytic cell of the character described, the positive or anode element of which presents faces in a predetermined plane, a foraminous cathode in a plane practically parallel therewith, a central cell body, and insulating material separate from said body and forming an adjustable shield for limiting the active surface of said cathode to a rectangular figure, the perforated portions of said cathode extending outwardly beyond the inner edges of said insulating material on each side of the rectangle.

27. In an electrolytic cell, the combination with a porous diaphragm, of a cathode in contact with the inner side thereof, an anode having an active face adjacent the opposite side of said diaphragm, and insulating material on the inner side of said diaphragm and forming an adjustable shield for limiting the exposed surface thereof to approximately the size of said active face, the perforated area of said cathode being greater than the inner exposed surface of said diaphragm.

28. In an electrolytic cell, the combination with a porous diaphragm, of a foraminous cathode in contact with one side thereof, an anode having an active face adjacent the opposite side of said diaphragm, and insulating material on the inner side of said diaphragm for limiting the exposed face thereof to an area smaller than that of the cathode.

29. In an electrolytic cell, the combination with a porous diaphragm, of a foraminous cathode in contact with one side thereof, an anode having an active face adjacent the opposite side of said diaphragm, and insulating material on the inner side of said diaphragm for limiting the exposed surface thereof to approximately the size of said active face, the active area of said cathode being greater than the inner exposed surface of said diaphragm.

30. In an electrolytic cell, the combination with a porous diaphragm of a foraminous cathode in contact with one side thereof, a second diaphragm on the opposite side thereof having gauze embedded therein, insulating material for limiting the active surface of the first porous diaphragm, and means for draining said cathode and acting upon substantially the entire surface thereof.

GEORGE A. GABRIEL.

Witnesses:
WALTER S. JONES,
EDWARD W. VAILL, Jr.